(12) United States Patent
Dimble et al.

(10) Patent No.: US 11,451,558 B2
(45) Date of Patent: Sep. 20, 2022

(54) INFORMATION SYSTEM END USER LOCATION DETECTION TECHNIQUE

(71) Applicant: The Boeing Company, Chicago, IL (US)

(72) Inventors: Atul Uttam Dimble, Bengaluru (IN); Kiran Narayan, Bengaluru (IN)

(73) Assignee: THE BOEING COMPANY, Chicago, IL (US)

( * ) Notice: Subject to any disclaimer, the term of this patent is extended or adjusted under 35 U.S.C. 154(b) by 172 days.

(21) Appl. No.: 16/820,303

(22) Filed: Mar. 16, 2020

(65) Prior Publication Data
US 2021/0288973 A1 Sep. 16, 2021

(51) Int. Cl.
*H04L 9/40* (2022.01)
*H04L 9/08* (2006.01)
*H04L 9/32* (2006.01)

(52) U.S. Cl.
CPC .......... *H04L 63/107* (2013.01); *H04L 9/0872* (2013.01); *H04L 9/3213* (2013.01); *H04L 9/3242* (2013.01)

(58) Field of Classification Search
CPC ... H04L 63/107; H04L 9/0872; H04L 9/3213; H04L 9/3242
USPC ........................................................ 713/159
See application file for complete search history.

(56) References Cited

U.S. PATENT DOCUMENTS

| | | | | |
|---|---|---|---|---|
| 8,955,069 B1* | 2/2015 | Dotan | ................. | H04L 63/0861 726/9 |
| 9,043,605 B1* | 5/2015 | Machani | ................. | G06F 21/35 713/185 |
| 9,355,231 B2* | 5/2016 | Disraeli | ................. | H04L 63/083 |
| 11,132,425 B1* | 9/2021 | Cohen | ................. | G06Q 20/4093 |
| 2009/0049556 A1* | 2/2009 | Vrielink | ................. | G06F 21/10 726/26 |
| 2009/0300738 A1* | 12/2009 | Dewe | ................. | G06Q 20/3827 713/176 |
| 2012/0203663 A1* | 8/2012 | Sinclair | ................. | G06Q 30/06 713/168 |
| 2015/0365402 A1* | 12/2015 | Woo | ..................... | H04L 63/067 726/6 |
| 2016/0036594 A1* | 2/2016 | Conrad | ................... | G06F 21/35 713/185 |
| 2019/0036940 A1* | 1/2019 | Balakrishnan | .......... | H04L 63/12 |
| 2020/0104891 A1* | 4/2020 | Rule | ................. | G06Q 20/4014 |
| 2020/0119908 A1* | 4/2020 | Christensen | .......... | H04L 9/3239 |
| 2020/0211002 A1* | 7/2020 | Steinberg | ............. | G06Q 20/385 |

\* cited by examiner

*Primary Examiner* — Jason K Gee
*Assistant Examiner* — Thanh T Le
(74) *Attorney, Agent, or Firm* — Alleman Hall Creasman & Tuttle LLP

(57) ABSTRACT

A method at a computing device is described. The method comprises executing an application for verifying a location of a user requesting to access a location-based service, receiving, at the application, information indicating a location of the computing device, and encoding, with the application, at least the location to thereby generate a location token for responding to a challenge for the location token. The method further comprises outputting the location token from the application, the location token configured for use in applying a location-based access policy that controls access by the user to the location-based service.

20 Claims, 9 Drawing Sheets

INFORMATION SYSTEM END USER LOCATION DETECTION TECHNIQUE

FIELD

The disclosure relates to authorizing user access to electronic resources, and particularly to authenticating user location as part of authorizing access to electronic resources.

BACKGROUND

Access to electronic resources is frequently controlled based on user authentication. A typical user authentication process involves verifying that a user's credentials, such as a username and password, match what is on record for that user. For some resources, access is also contingent upon the location from which access is requested. For example, a resource owner may institute a location-based access policy controlling access based upon location to satisfy legal requirements such as export regulations controlling the transfer of data, and data sovereignty regulations that stipulate conditions specific to the geographic region in which data resides. In such examples, a location-based authorization process can be performed to determine the location from which resource access is requested and thereby ensure compliance with the location-based access policy.

Some location-based authorization processes determine the geographic location of a device requesting resource access based on a network address (e.g., internet protocol address) assigned to the device. Geographic locations determined in this manner can be unreliable, however—for example, if the device requests access through a virtual private network or a remote desktop connection, the network address may not represent the actual geographic location of the device. These and other networking mechanisms thus can provide a straightforward method of bypassing network address-based authorization processes. Other location-based authorization processes track users requesting resource access. However, such processes can compromise user privacy and may be perceived as intrusive.

As a result of these and other issues associated with existing location-based authorization processes, users may develop an aversion to sharing data, even when permitted by law. This can reduce productivity, in turn adversely affecting an organization's economics. Penalties levied for the mishandling of data can also dissuade users and organizations from data sharing and use of existing location-based authorization techniques.

SUMMARY

To address the above issues, according to one aspect of the present disclosure, a method, at a computing device, is provided. In this aspect, the method comprises executing an application for verifying a location of a user requesting to access a location-based service, receiving, at the application, information indicating a location of the computing device, and encoding, with the application, at least the location to thereby generate a location token for responding to a challenge for the location token. The method further comprises outputting the location token from the application, the location token configured for use in applying a location-based access policy that controls access by the user to the location-based service.

Another aspect of the present disclosure relates to a computing device. In this aspect, the computing device comprises a logic subsystem, and a storage subsystem comprising instructions executable by the logic subsystem to output a request by a user to access a location-based service, and receive a challenge for a location token. In this aspect, the storage subsystem further comprises instructions executable by the logic subsystem to receive user input comprising the location token, the location token being generated at another computing device of the user, and output the location token, the location token configured for use in applying a location-based access policy that controls access by the user to the location-based service.

Another aspect of the present disclosure relates to a method of authorizing user access to location-based services. In this aspect, the method comprises at a first computing device, outputting a request by a user to access a location-based service, and receiving a challenge for a location token. In this aspect, the method further comprises, at a second computing device, executing an application for verifying a location of the user requesting access to the location-based service, receiving, at the application, information indicating a location of the second computing device, encoding, with the application and via a user-specific secret key, at least the location of the second computing device to thereby generate the location token, and outputting the location token from the application. In this aspect, the method further comprises, at the first computing device, receiving user input comprising the location token, and outputting the location token, the location token configured for validation using the user-specific secret key to thereby verify the location of the second computing device, where the location of the second computing device at least in part controls access by the user to the location-based service.

The features, functions, and advantages that have been discussed can be achieved independently in various embodiments or can be combined in yet other embodiments, further details of which can be seen with reference to the following description and drawings.

DETAILED DESCRIPTION

Figure 1A:
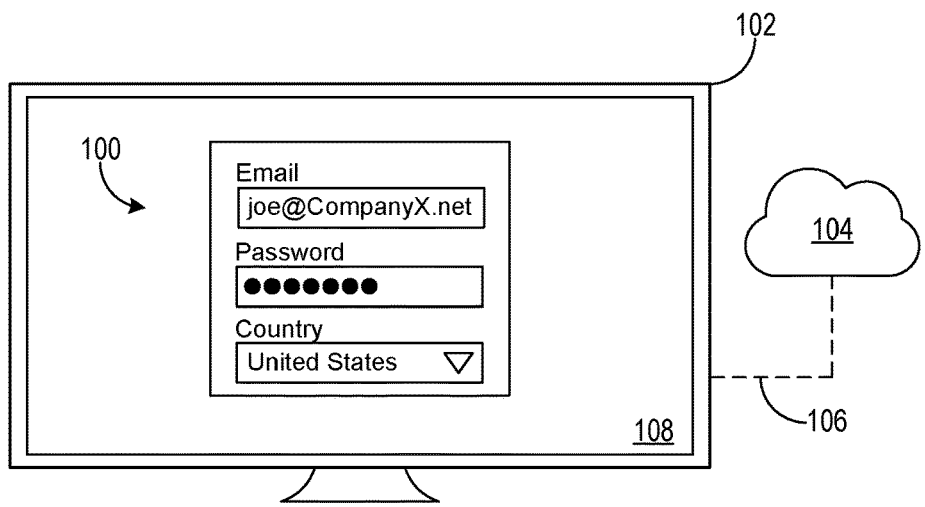
FIGS. 1A-1F show illustrations depicting an example process for controlling access to location-based services.

In view of the considerations discussed above, devices and methods are provided that relate to verifying the location of a user requesting to access a location-based service, for example in connection with a request to access a protected resource (e.g., access contingent upon the request being issued from an approved location). Briefly, in the context of accessing a protected resource, a request is received from a first computing device, such as a desktop computing device associated with the user. In response to the request, a remote authorization service challenges the user to provide information regarding their location. A second computing device, such as a mobile computing device registered to the user, executes an application that generates a location token encoding the location information, which can be sensed by the second computing device. The location token is received at the first computing device and relayed to the remote authorization service, which attempts to validate the token. In one example, if the token is deemed valid, the location of the second computing device is compared to a location-based access policy that controls access to the protected resource based on the location from which access requests originate. The location-based access policy can stipulate a variety of conditions that control whether and/or how the protected resource can be accessed. For example, the location-based access policy can permit or deny access to the protected resource based on the indicated location, such that access by the user to the protected resource is granted if the policy permits access from the indicated location. Conversely, access can be denied if the policy does not permit access from the indicated location. In another example, a request to access one or more location-based services is received, such as a location-based service that hosts or otherwise controls access to a protected resource. Based on a challenge issued in response to the request, a token is generated, and if the token is deemed valid, the location of the second computing device is utilized to provide one or more location-based services to the user.

The location-based authorization process disclosed herein can enable location-based resource/service access without invasive user tracking and privacy violations. Further, the separation of resource/service access and location determination between different devices (and potentially between different networks) can render authorization less susceptible to location spoofing and unauthorized resource/service access, particularly in implementations where location information is determined via a sensor. Sensing location information can also help avert penalties that might otherwise result from the manual entry of incorrect location information by users. Further, security is enhanced where encryption and/or hashing is used to encode and decode location information. For example, keys specific to individual users can be used to encode and decode information, and can be securely hosted and transmitted.

FIGS. 1A-1F illustrate an example location-based authorization process from a user perspective performed in service of a request for a location-based service. In particular, access to a protected resource hosted by the location-based service is requested. As described below, the protected resource can assume the form of a file remotely hosted by the location-based service, which can be a cloud storage provider. In FIG. 1A, a user signs into an employee portal 100 via a computing device 102, such as, but not limited to a desktop computing device, by suppling user credentials in the form of an email address and a password. Portal 100 can be provided as part of an application locally executed on computing device 102, a web-based application hosted by a remote authorization service 104 and provided through a web browser executed on computing device 102, a login process to a remote server, or in any other suitable manner. The user credentials are received by a remote authorization service 104, which is in communication with computing device 102 via a network connection 106 (e.g., an internet or intranet connection). As shown in FIG. 1A, portal 100 can also be operable to identify the country in which the user currently resides, which in some examples can be used to control access by the user to protected resources as described below.

Figure 1B:
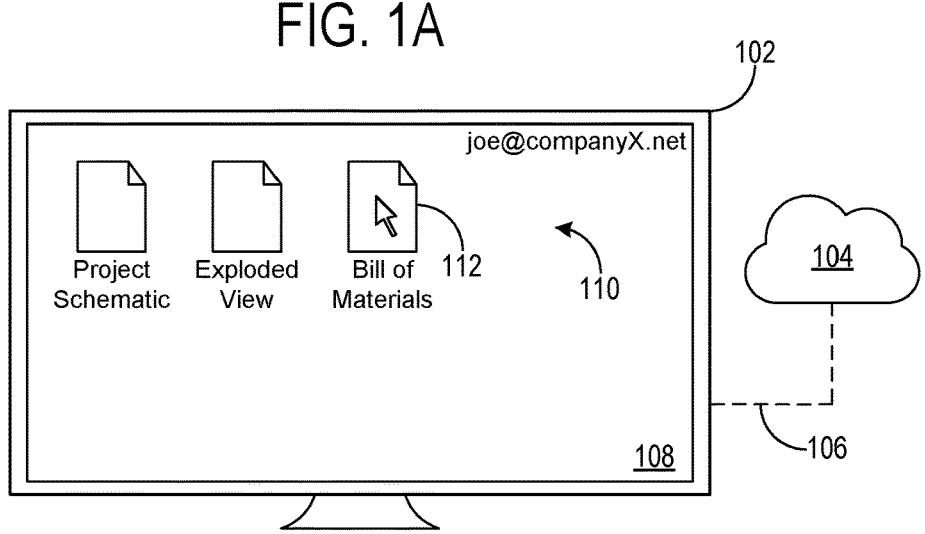

Authorization service 104 evaluates the user credentials and, as the credentials match what is on record for the user, grants access by the user to portal 100. Accordingly, computing device 102 outputs, via a display 108, a user interface 110 that includes various controls each selectable to obtain access to a corresponding remotely hosted file, as shown in FIG. 1B. The files that the user is granted access to can be selected based on an identity of the user, a role assigned to the user, a privilege assigned to the user, a group membership of the user, an account type of the user, and/or any other suitable criteria. Further, the files shown in FIG. 1B are examples of a protected resource. As used herein, a "protected resource" refers to any suitable electronic object, data, information, etc. to which access can be controlled based on the location-based authorization process disclosed herein. As examples, a protected resource can include an electronic file, such as a document, image, video, audio, and three-dimensional model; a script; code; and/or an application. Further, and as described below, a protected resource is one example of what can be requested from a location-based service that hosts/provides electronic objects, services, data, information, and/or any other suitable items that are accessed subject to the location-based authorization process described herein. In some examples, access to the location-based service itself can be requested, alternatively or in addition to requesting access to a protected resource.

Figure 1C:
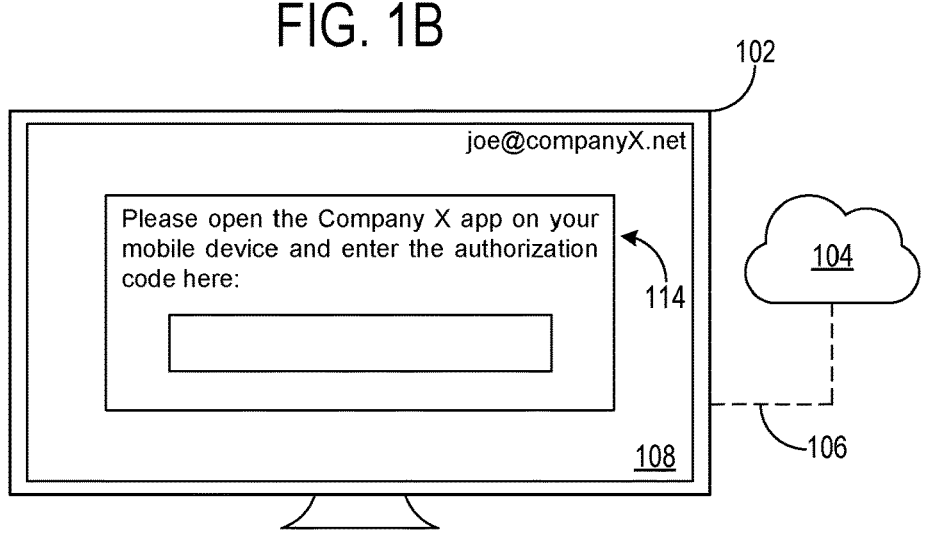

In FIG. 1B, the user attempts to access a protected resource 112 in the form of a document comprising a bill of materials. However, access to resource 112 is controlled according to a location-based access policy that stipulates conditions regarding the location from which the resource 112 can be accessed. For example, the access policy can whitelist a set of locations (e.g., countries) from which resource 112 can be accessed, such that the resource 112 cannot be accessed from locations not within the whitelist. In service of the access policy, authorization service 104 initiates a location-based authorization process to determine the location from which the user requests access to resource 112. As part of this process, authorization service 104 causes computing device 102 to output a user interface 114 prompting the user to open an authorization application on a mobile computing device registered to the user, as shown in FIG. 1C. User interface 114 specifically instructs the user to enter, at computing device 102, a location token output by the authorization application.

Figure 1D:
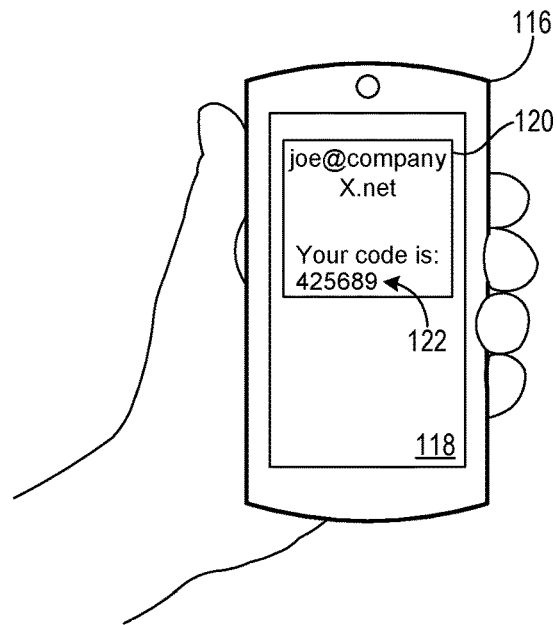

FIG. 1D illustrates execution of the authorization application on a mobile computing device 116 registered to the user. The authorization application causes the output, via a display 118 of computing device 116, of a user interface 120 that includes a location token 122. Location token 122 is generated by the authorization application and encodes information indicating the location of mobile computing device 116 and thus the location of the user. As described in further detail below, the location information can be determined by mobile computing device 116—e.g., via a sensor of the mobile computing device 116—and in some examples can be encrypted and/or hashed with a secret key specific to the user of mobile computing device 116. These aspects can reduce the potential for location spoofing and unauthorized access to protected resource 112.

Figure 1E:
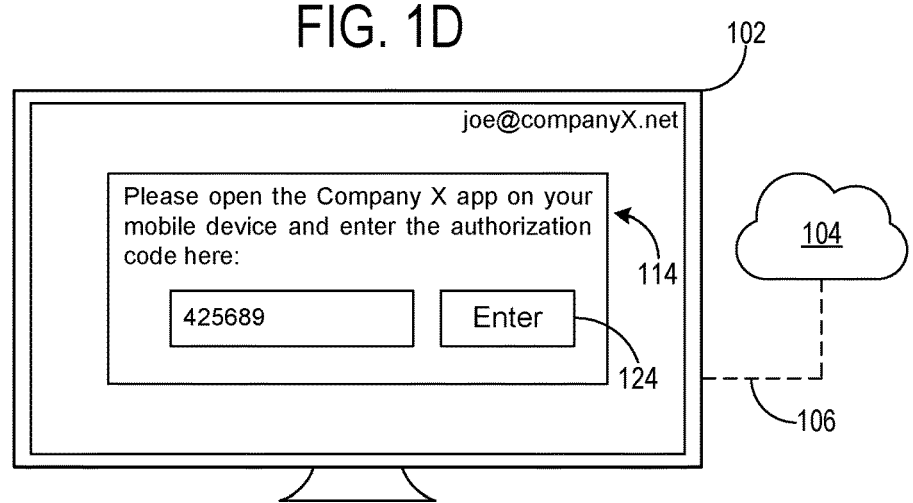
Figure 1F:
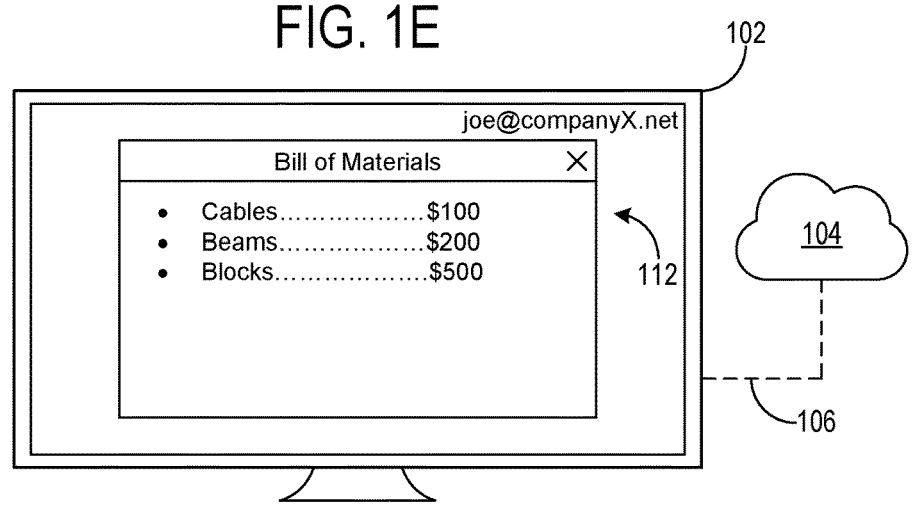

FIG. 1E illustrates entry of location token 122 at user interface 114 on computing device 102. Here, the user enters location token 122 via a suitable input device (e.g., a keyboard) coupled to computing device 102 to identify their location to authorization service 104 and obtain access to protected resource 112. In response to selecting a control 124, location token 122 is sent to authorization service 104, which validates the location token 122 to determine the location of mobile computing device 116. In this example, the location of mobile computing device 116, and thus the user, is a location from which access to protected resource 112 is allowed by the location-based access policy. Accordingly, authorization service 104 grants access to protected resource 112 from computing device 102 as shown in FIG. 1F, which shows the protected resource 112 being opened.

While being respectively shown in desktop and mobile form factors, computing devices 102 and 116 can assume any suitable form, including but not limited to that of a laptop, tablet, server, mobile, and terminal computing device. Further, and as described in greater detail below, various aspects of the location-based authorization process illustrated in FIGS. 1A-1F can be modified. For example, the location of mobile computing device 116/the user can be verified before a selection of a protected resource is made— e.g., before user interface 110 is output at computing device 102. As another example modification, the login process illustrated in FIG. 1A can omit user selection of the country in which the user currently resides.

Figure 2:
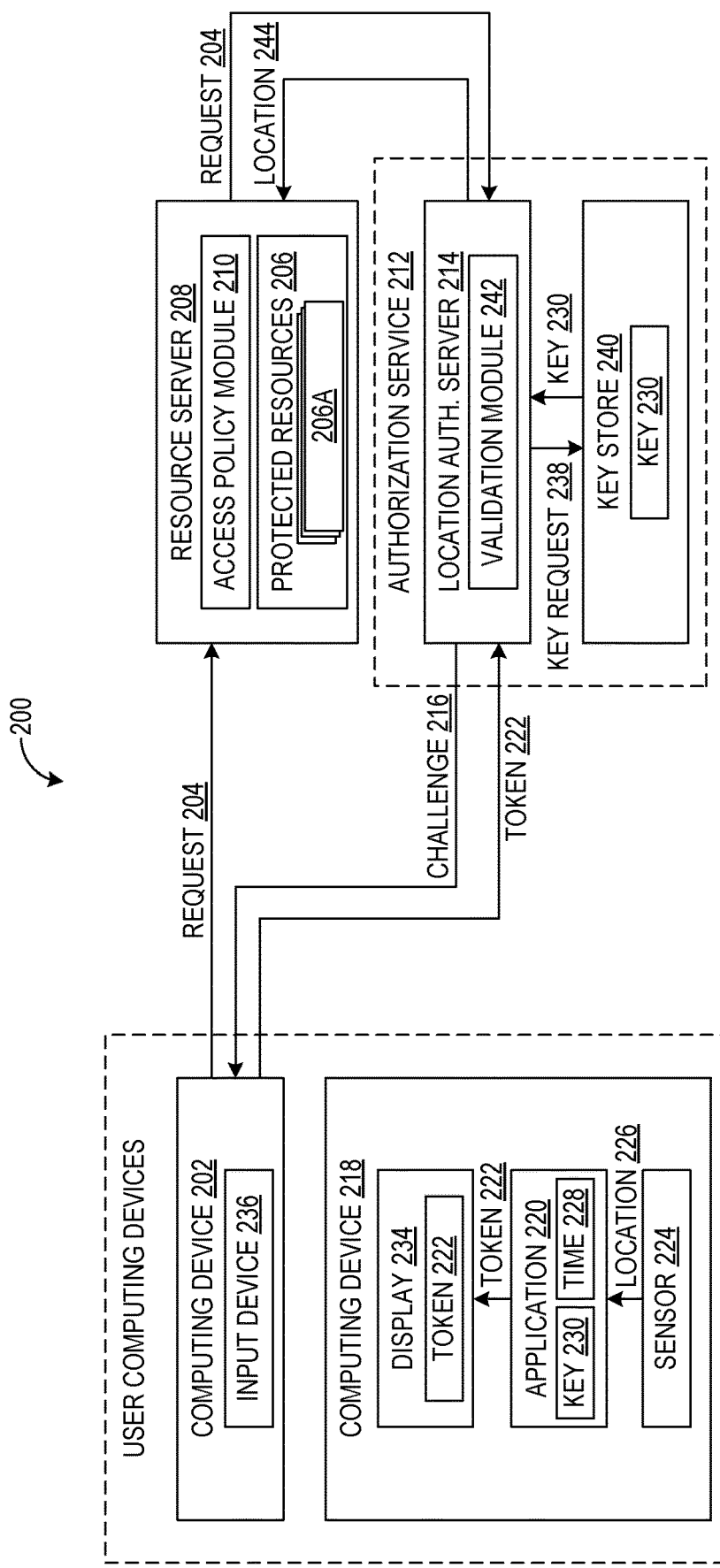
FIG. 2 shows an illustration depicting an example system in which access to location-based services is controlled based on a location-based authorization process.

FIG. 2 schematically shows an example system 200 in which access to location-based services is controlled according to a location-based authorization process. The depicted example specifically illustrates access to a protected resource hosted by a location-based service (e.g., cloud storage provider). However, system 200 can be used to implement location-contingent access to any suitable location-based service and electronic object(s) hosted or provided by such services. An example in which access to a location-based service itself is requested is described below with reference to FIGS. 4 and 5.

In system 200, a first computing device 202, associated with a user, is used to issue a request 204 for a protected resource 206A among a set of protected resources 206 remotely hosted at a resource server 208. First computing device 202 can be computing device 102, and protected resource 206A can be protected resource 112, as examples. As described above, protected resource 206A can be a file (e.g., image, document, video), application, and/or any other suitable electronic object(s) to which access is controlled according to the location-based authorization process described herein.

Via an access policy module 210, resource server 208 institutes a location-based access policy that stipulates conditions regarding the location from which protected resource(s) 206 can be accessed by remote devices such as computing device 202. Resource server 208 routes request 204 to an authorization service 212 in order to solicit location information from the user issuing the request 204 (referred to herein as the "requesting user") that can be used to determine whether the user's location satisfies the location-based access policy. In response to receiving request 204, authorization service 212 sends, via a location authorization server 214, a challenge 216 to computing device 202 for such location information. In particular, challenge 216 solicits the user for the location information in an encoded form referred to herein as a "location token", the generation of which is described below. Challenge 216 can assume any suitable form. For example, challenge 216 can include data that, when received by computing device 202, causes the computing device 202 to output a user interface (e.g., user interface 114) prompting the user to execute an application on another computing device for verifying their location.

FIG. 2 shows a second computing device 218 associated with the user issuing request 204, where the second computing device 218 is used to execute an application 220 for verifying the user's location. Application 220 can be installed on computing device 218 in any suitable manner. In one example, application 220 is installed on computing device 218 as part of a registration process in which the computing device 218 is registered to its user. In this process, the user can supply user credentials (e.g., via portal 100) identifying themselves, and can identify computing device 218 as a new device to be used for verifying their location to thereby access protected resource(s) 206 or, more generally, location-based services. Application 220 can be provided in any suitable manner—for example, through a digital application store operated by an employer of the user and/or by an owner of protected resource(s) 206. In some examples, application 220 can be downloaded via a network external to the employer/owner. Further, computing devices 202 and 218 can have any suitable association with the requesting user. For example, one or both of computing devices 202 and 218 can be owned, leased, or rented by the requesting user. As another example, one or both of computing devices 202 and 218 can be issued by an owner of protected resource 206A, such as an employer of the requesting user. As yet another example, one or both of computing devices 202 and 218 can be provided by an operator of authorization service 212. In some examples, one or both of computing devices 202 and 218 can be associated with a subscriber account (e.g., both of computing devices 202 and 218 can be associated with a common subscriber account).

Application 220 is operable to generate a location token 222 that encodes information indicating a location of computing device 218. As described below, location token 222 can be validated to thereby determine the location of computing device 218, enabling resource server 208 to compare this location to the location-based access policy and thereby control access to protected resource 206A from first computing device 202. The location of computing device 218 can be determined in any suitable manner. FIG. 2 illustrates examples in which the location is detected via a sensor 224 of computing device 218. As one example, sensor 224 can be a global positioning system (GPS) sensor, in which case application 220 receives a location in the form of GPS coordinates. Other location information can be received by application 220 and encoded as part of location token 222 alternatively or in addition to the location determined by sensor 224, including but not limited to information indicating the location of a server (e.g., a mobile telephony server or cellular tower) to which computing device 218 is communicatively coupled. As such additional location information can be difficult to spoof, its use can support the authenticity of token 222 and thereby reduce the potential for obtaining unauthorized access to protected resources 206.

In the example depicted in FIG. 2, location information 226 is output from sensor 224 and received at application 220, which generates location token 222 based at least on the location information 226. Additional data can be used to generate location token 222, such as a timestamp 228—e.g., the time at which the location token 222 is generated. In such examples, authorization service 212, upon receiving token 222, can use timestamp 228 to determine an age of token 222, and can invalidate the token 222—and thus deny access to protected resource 206A—if the token 222 is older than a predetermined age. In service of this age-based policy, application 220 can generate new tokens at any suitable interval, such as thirty seconds or one minute. By continually generating tokens at relatively high frequencies, the possibility that an outdated token indicating an inaccurate location of computing device 218—e.g., due to its movement to a new location—is used to access a protected resource 206 is reduced. Any other suitable trigger can prompt token generation, alternatively or in addition to generation at an interval, however. As examples, token generation can be prompted by execution of application 220 and/or by user selection of a control provided by the application 220 for generating tokens.

Application 220 encodes location information 226 to thereby generate location token 222. As described above, application 220 can encode additional information in generating token 222, including but not limited to timestamp 228 and location information indicating the location of a server to which computing device 218 is communicatively coupled. In some examples, application 220 hashes location information 226 and potentially the additional information to generate location token 222 via any suitable hashing algorithm. Further, in some examples, location information 226 and the potential additional information can be hashed using a secret key specific to the requesting user to thereby generate location token 222. Thus, the user-specific secret key can be used to encrypt location information 226 and the potential additional information. Accordingly, location token 222 can be referred to as being encrypted in such examples.

FIG. 2 illustrates one example in which location information 226 and timestamp 228 are hashed using a user-specific secret key 230 stored at computing device 218. Secret key 230 can be specifically created for the requesting user, for example, and can be stored at authorization service 212 and used to validate token 222 and identify the location of computing device 218 as described below. In some examples, secret key 230 can be stored on computing device 218 as part of installing a certificate on the computing device 218. The certificate can be installed during the registration process described above in which computing device 218 is registered to its user, for example. Alternatively or additionally, secret key 230 can be transmitted to computing device 218 from authorization service 212 in encrypted form—for example, the secret key 230 can be encrypted (e.g., at the authorization service 212) and decrypted (e.g., at the computing device 218) via an asymmetric public/private key pair (e.g., specifically generated for the requesting user).

FIG. 2 shows the output of location token 222 from application 220 to a display 234 of second computing device 218. Token 222 can assume any suitable form, such as a sequence of numbers, as in the example depicted in FIGS. 1D and 1E. In other examples, token 222 can include an alphanumeric string, barcode, and/or a QR code. In these examples, a graphical representation of token 222 is provided on display 234, allowing the requesting user to supply the token 222 to first computing device 202 through an input device 236. Token 222 is then provided to authorization service 212 to respond to challenge 216 for the token 222, as shown in FIG. 2.

Upon receiving token 222, authorization service 212 attempts to validate the token 222. Validation of token 222 can take various suitable forms. In one example in which token 222 is encoded via encryption using secret key 230, authorization service 212 decodes the token 222 via decryption using the secret key 230, as illustrated in FIG. 2. Here, location authorization server 214 of authorization service 212 issues a request 238 to a key store 240 for secret key 230. Key store 240 can store keys in an encrypted database, as one example. To obtain secret key 230, which specifically corresponds to the requesting user, request 238 can include an identification of this user. This user identification can be included in request 204 for protected resource 206A and obtained from a user login process—e.g., the login process at portal 100 illustrated in FIG. 1A.

In response to request 238, key store 240 identifies secret key 230 as the key corresponding to the requesting user and sends the key 230 to location authorization server 214. Where secret key 230 is stored on computing device 218 as part of installing a user public certificate on the computing device 218, server 214 can obtain a corresponding private certificate from key store 240. Then, via a validation module 242, server 214 decodes token 222 via decryption using secret key 230. In some examples in which the data used to generate token 222—e.g., location information 226 and potentially timestamp 228 and/or additional information—is hashed, the decoding of token 222 reveals such hashed information that can be validated by validation module 242. For example, a hash code generated by hashing this information and revealed by decoding token 222 can be at least in part independently validated by validation module 242. Here, validation module 242 generates its own hash code using the information that was used to generate the hash code contained in token 222.

In one example in which a manual selection is made by the requesting user of their country of residence (e.g., made via portal 100 as shown in FIG. 1A), which can be included in request 204, validation module 242 hashes a country code representing this country, along with a timestamp (e.g., corresponding to the time at which token 222 was received or an estimated time at which the token 222 was generated) to thereby generate a hash code. Validation module 242 then compares this hash code to the hash code revealed by decrypting token 222. If the hash codes match, token 222 is validated, and the country code can be passed in the form of a location 244, representing the location of computing device 202, to resource server 208 for applying the location-based access policy governing access to protected resource 206A. If the hash codes do not match, token 222 can be invalidated, which can prompt an at least partial repeat of the location authorization process.

In another example in which a manual selection by the requesting user of their country of residence is not made, validation module 242 can instead generate a hash code for each country (or any other suitable geographic region) from which access to protected resource 206A is whitelisted by the location-based access policy. Then, validation module 242 can compare the hash code revealed by decrypting token 222 to the hash codes generated at validation module 242. If a match is identified, a country code corresponding to the matching country, in the form of location 244, can be passed to resource server 208 for applying the location-based access policy. If a match is not identified, token 222 can be invalidated, which can prompt an at least partial repeat of the location authorization process.

Any suitable method can be used to validate token 222 and/or extract information therein, however. In other examples, token 222 can be decoded (e.g., decrypted) to thereby reveal location information 226 (and potentially other information encoded in the token 222), which can be passed in the form of location 244 to resource server 208 for applying the location-based access policy. Further, any suitable type of geographic region other than country can be evaluated in determining the location of computing device 218. In this case, a suitable representation of the geographic region can be evaluated and passed to resource server 208.

In some examples, location authorization server 214 validates token 222 further based on timestamp 228. As described above, the age of timestamp 228 (e.g., between the time at which the timestamp 228 is generated and the current time as known by server 214) can be compared to a predetermined age. If the age of timestamp 228 is less than or equal to the predetermined age, token 222 is deemed valid, and location 244 can be passed to resource server 208 pending additional validation as described above. If the age of timestamp 228 is greater than the predetermined age, token 222 is deemed invalid, and location 244 is not passed to resource server 208. In this case, access to protected resource 206A can be denied, and a message indicating the denial of access can be sent to computing device 202. If the requesting user wishes to reattempt access to protected resource 206A, the user can enter a new token generated by application 220 at computing device 202.

In view of the above, "validation" of a location token as used herein can refer to one or more of decryption of the location token, evaluation of a hash code contained in the location token (e.g., comparison of a hash code contained therein to a hash code generated by validation module 242), evaluation of information (e.g., location information) extracted from the location token (e.g., via decryption of the token), and/or evaluation of a timestamp associated with the generation of the location token.

In the depicted example, timestamp 228 indicates that the age of token 222 is within a valid range. As such, location authorization server 214 passes a location 244 of computing device 218 to resource server 208. In some examples, location 244 is indicated by location information 226 and encoded in token 222. In this case, sensor 224 can directly output location 244 (within location information 226) to application 220. For example, sensor 224 can output one or more GPS coordinates of computing device 218. In other examples, location 244 is derived from location information 226, for example at application 220, location authorization server 214, or resource server 208. Location 244 can indicate any suitable type of location, including but not limited to a country (e.g., represented by a country code), city, state, province, municipality, county, zip code, address, and/or any suitable geographic region.

Location authorization server 214 applies the location-based access policy instituted by access policy module 210 for protected resource 206A to determine whether location 244 of computing device 218 satisfies the access policy. In the depicted example, location 244 satisfies the location-based access policy for protected resource 206A. As such, resource server 208 grants access to protected resource 206A from computing device 202.

Location-based access policies, including the policy controlling access to protected resource 206A, can be defined in any suitable manner. As described above, in one example the location-based access policy for resource 206A can whitelist a set of regions (e.g., countries) from which access to the resource 206A is allowed. Conversely, access from regions not within the whitelist can be denied. The policy can stipulate any alternative or additional conditions, including but not limited to time periods in which access is permitted/denied, devices from which access is permitted/denied, and/or more granular access privileges (e.g., read only, read/write, whether protected resource 206A can be downloaded to computing device 202 or is non-downloadable but remotely accessible). Further, the policy can stipulate conditions on the entirety of protected resource 206A and/or portions of the protected resource 206A. Alternatively or additionally, the policy can define accessibility for other protected resources 206 in addition to protected resource 206A. The policy also can be adapted to the type of protected resource for which the policy is defined. Thus, in some examples, the policy can stipulate different condition(s) depending on whether protected resource 206A is an electronic file, code, application, or any other suitable type of electronic object to which access can be controlled according to the policy.

Various aspects of system 200 can be modified. For example, various functionality illustrated in FIG. 2 can be implemented among different devices/components—e.g., resource server 208 and authorization service 212 can be combined, or the resource server 208 and location authorization server 214 can be combined. As another example, request 204 can be a request for protected resources 206 in general without an identification of a particular protected resource 206 to which access is requested. In this case, after determining the requesting user's location, a manifest of protected resources 206 accessible from the user's location can be provided to computing device 202.

Figure 3A:
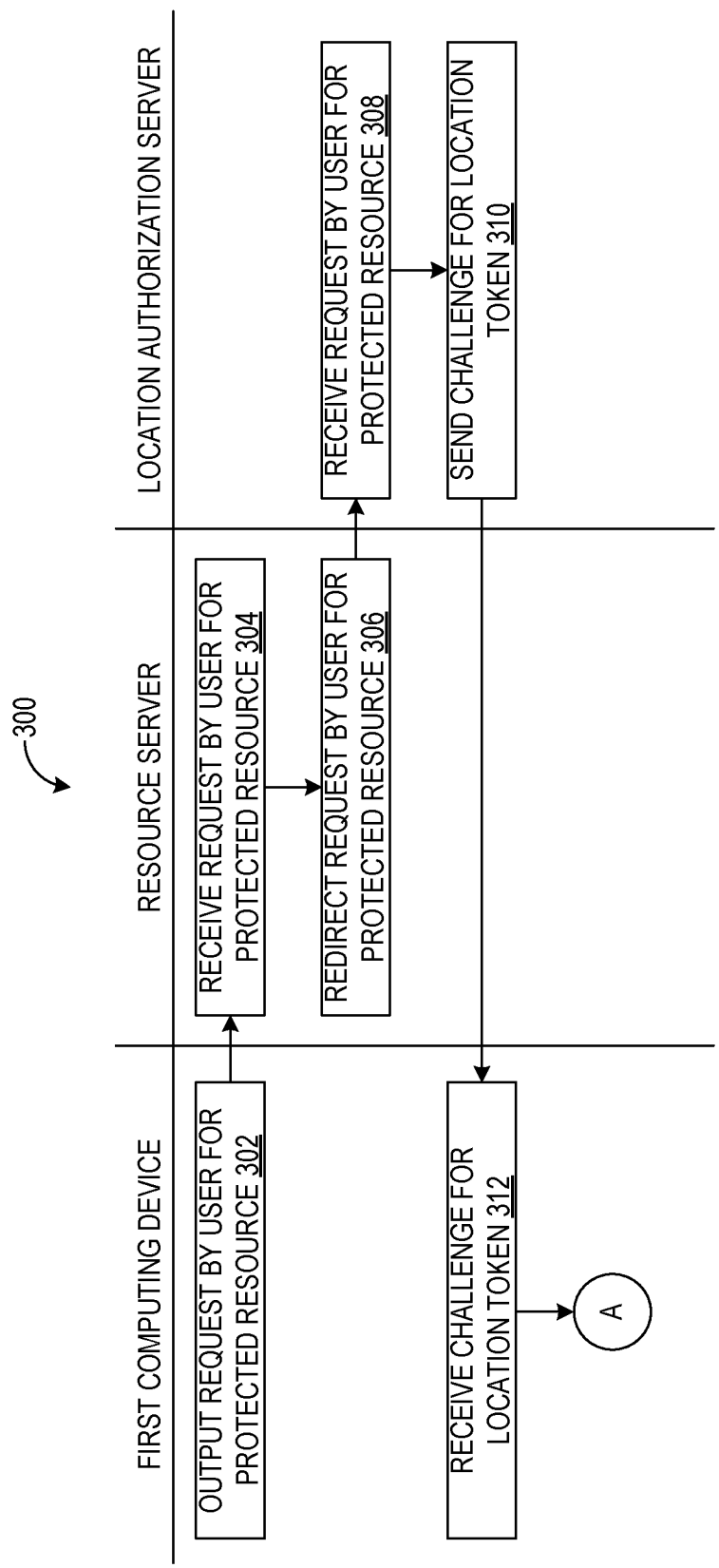
FIGS. 3A-3C show illustrations of operations of a method performed according to an example embodiment of the present disclosure.
Figure 3B:
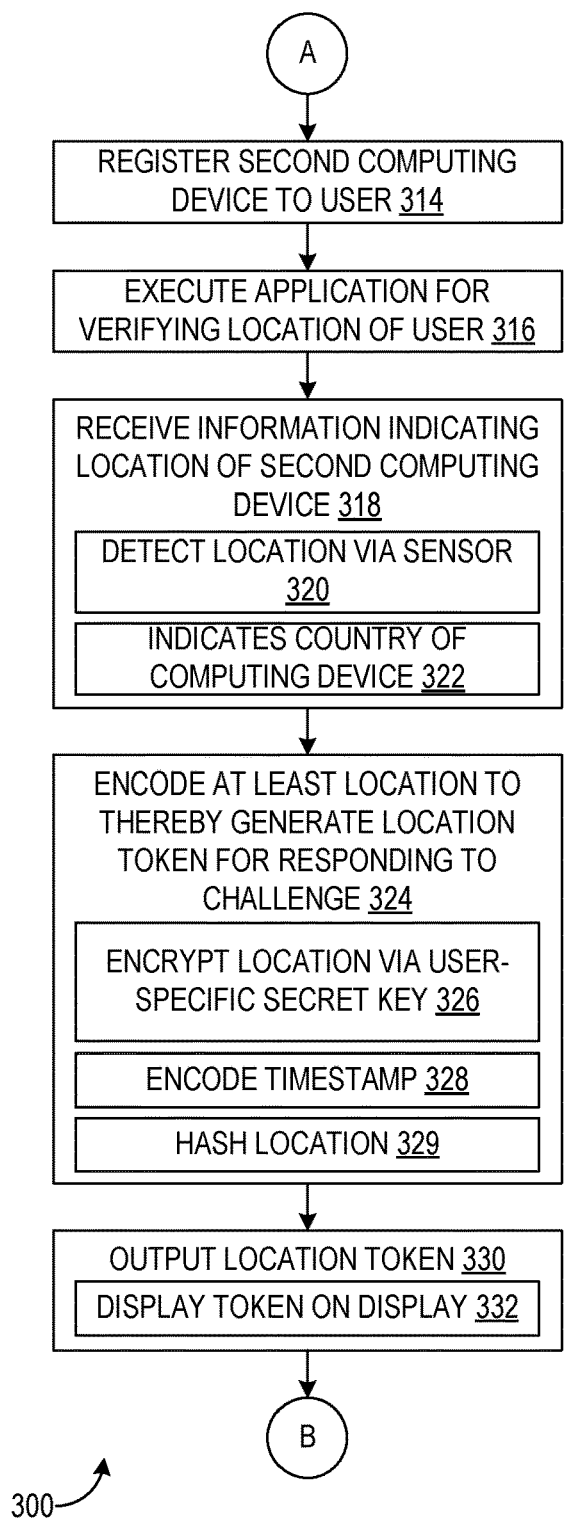
Figure 3C:
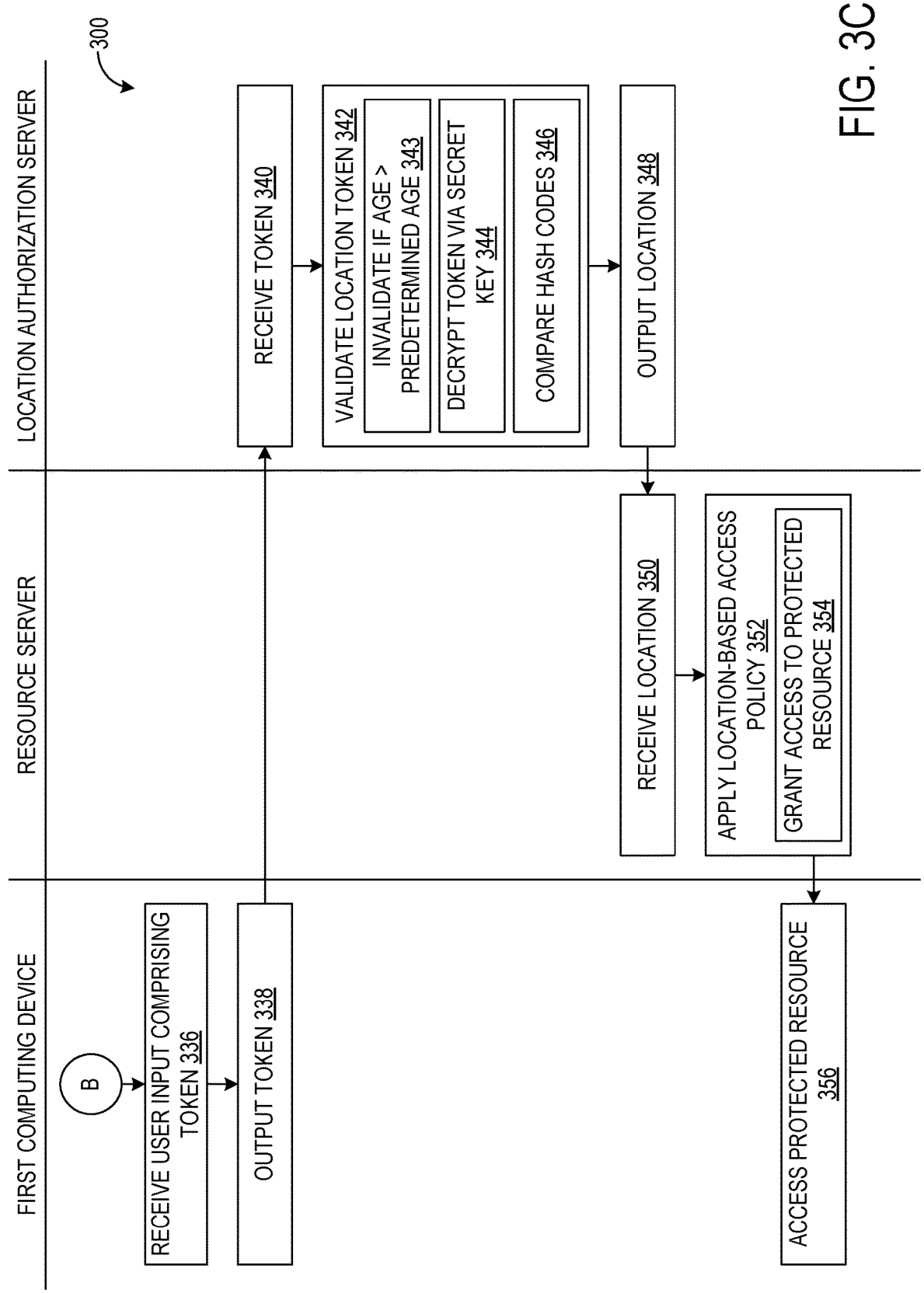

FIGS. 3A-3C show a flowchart illustrating a method 300 of authorizing user access to protected resources. Method 300 can be implemented at system 200 of FIG. 2, for example. In other examples, user access to location-based services can be authorized, as described in further detail below with reference to FIGS. 4 and 5.

At 302, method 300 includes, at a first computing device, outputting a request by a user for a protected resource. The request can be request 204 for protected resource 206A sent from computing device 202, for example. At 304, method 300 includes, at a resource server, receiving the request by the user for the protected resource. The resource server can be resource server 208, for example. At 306, method 300 includes redirecting the request by the user for the protected resource from the resource server to a location authorization server. The location authorization server can be location authorization server 214, for example. At 308, method 300 includes receiving, at the location authorization server, the request by the user for the protected resource, and at 310, sending, from the location authorization server to the first computing device, a challenge for a location token. At 312, method 300 includes receiving, at the first computing device, the challenge for the location token.

Turning to FIG. 3B, at 314 method 300 includes registering a second computing device to the user. For example, second computing device can be computing device 218 registered with authorization service 212. The second computing device can be registered at any other suitable point, however, such as before the request for the protected resource is issued at 302. At 316, method 300 includes executing, at the second computing device, an application for verifying a location of the user requesting the protected resource. The second computing device can execute application 220, for example. At 318, method 300 includes receiving, at the application, information indicating a location of the second computing device. Receiving the location information can include detecting 320 a location of the second computing device via a sensor of the second computing device. The sensor can be sensor 224, for example. The location information can indicate 322 a country in which the second computing device is located. Alternatively or additionally the location information can indicate any other suitable geographic region corresponding to the location of the second computing device. In some examples, the location of the second computing device can be extracted (e.g., at the authorization service, and in hashed or unhashed form) from the location information. In other examples, the location information can explicitly indicate the location of the second computing device. In one example, the location is represented by a country code indicating the country in which the second computing device resides.

At 324, method 300 includes encoding, with the application, at least the location of the second computing device to thereby generate a location token for responding to the challenge for the location token. Location token can be token 222, for example. Encoding at least the location can include encrypting 326 at least the location via a user-specific secret key to thereby generate the location token. The secret key can be key 230, for example. Encoding at least the location can include further encoding 328 a timestamp along with the location to thereby generate the location token. The timestamp can be timestamp 228, for example. In some examples, other information alternatively or in addition to the timestamp can be encoded along with the location, such as the location of a server to which the second computing device is communicatively coupled. Encoding at least the location can include hashing 329 at least the location (e.g., using the user-specific secret key with which the hashed location is decoded). The timestamp and/or additional information can also be hashed along with the location, in some examples. In some examples, at least the location and potentially additional information can be both encrypted and hashed to thereby generate the location token.

At 330, method 300 includes, outputting, from the application, the location token. Outputting the location token can include displaying 332 the location token on a display of the second computing device. The display can be display 234, for example.

Turning to FIG. 3C, at 336 method 300 includes receiving, at the first computing device, user input comprising the location token. For example, the user can type the token into the first computing device via a keyboard. At 338, method 300 includes outputting the location token from the first computing device to the location authorization server. The location token can be sent via a suitable network connection, such as an Internet or intranet connection, for example.

At 340, method 300 includes receiving the location token at the location authorization server. At 342, method 300 includes validating, at the location authorization server, the location token. Validating the location token can include invalidating 343 the location token if an age of the token is greater than a predetermined age. Validating the location token can include decrypting 344 the token via the user-specific secret key. The location authorization server can retrieve the secret key from key store 240, for example. Validating the location token can include comparing 346 a hash code generated at the location authorization server to a hash code extracted from the location token (e.g., extracted from a decrypted version of the token). The hash code can be generated using information corresponding to the information used to generate the location token. For example, the hash code can be generated based on a country code or other representation of the location of the second computing device, and potentially a timestamp at which the token was generated (e.g., actual or estimated timestamp). In other examples, the location authorization server can generate a hash code for each country or other location or region whitelisted by a location-based access policy, and can attempt to identify a match between a generated hash code and the hash code extracted from the location token. If a match is identified, the location token can be validated, and if a match is not identified, the token can be invalidated.

At 348, method 300 includes outputting the location of the second computing device from the location authorization server to the resource server, in response to validating the location token. The location can be determined based on identifying a match between a hash code generated at the location authorization server and a hash code extracted from the location token, or can be extracted (e.g., in the form of a country code) from the token.

At 350, method 300 includes receiving the location of the second computing device at the resource server. At 352, method 300 includes applying, at the resource server, a location-based access policy that controls access by the user to the protected resource requested at 302. Applying the location-based access policy can include granting 354 access by the user to the protected resource where the location of the second computing device is a location from which access to the protected resource is allowed by the location-based access policy. Thus, method 300 can include, at 356, accessing the protected resource from the first computing device. Conversely, where the location of the second computing device is a location from which access to the protected resource is not allowed by the location-based access policy, access to the protected resource from the first computing device can be denied.

Although the above-described access to location-based services has been described primarily in the context of accessing protected resources (e.g., files on a secure cloud server), it will be understood that the location-based authorization implementations herein have broad applicability. For example, an end user location determined according to the approaches disclosed herein can be used to provide location-based services, with or without controlling access to such location-based services. In other words, the use of a determined end user location is not limited to access control. As used herein, a "location-based service" refers to any suitable electronic object(s)/data/software/hardware/etc. that can be provided according to the location-based authorization process described herein. A location-based service can include physical device(s) associated with the service (e.g., device(s) used to provide the service) and/or electronic data (e.g., data hosted by the service), that is provided based at least in part based on end user location. As such, provision of a location-based service can refer to providing access to a physical device and/or data stored on a physical device. For example, a location-based service can provide protected resource(s), including but not limited to files, scripts, code, applications, and/or other electronic data/information. Alternatively or additionally, the location-based service can provide access to physical devices, including but not limited to a storage device, a logic device (e.g., processor), a graphics processing unit (GPU), a field-programmable gate array (FPGA), an application-specific integrated circuits (ASIC), and/or any other suitable physical device. Alternatively or additionally, the location-based service can provide access to a network location. Alternatively or additionally, the location-based service can provide an application at least in part hosted remotely from a user device requesting access to the application. In other examples, the location-based service at least in part can provide an application hosted locally at such a user device.

Further examples of electronic service(s) that can be provided at least in part by a location-based service include but are not limited to banking, social networking, email, gaming (e.g., multiplayer gaming), streaming (music, video, game streaming), data storage, and cloud computing (e.g., data analysis, machine learning). As another example, a location-based service can provide a user interface (e.g., a file explorer) customized based on an end user location. In some examples, the user interface is displayed prior to determining the end user location, while in other examples the user interface is not displayed prior to determining the end user location. As yet another example, a location-based service can provide recommendations based on an end user location. Recommendations can include but are not limited to restaurants, stores, and other businesses local to the end user location, which for example can be provided as part of a maps application. Recommendations can further include suggested travel routes local to the end user location, which for example can be provided as part of a navigation application. Recommendations can further include suggested human contacts local to the end user location, which for example can be provided as part of a dating or social networking application. Recommendations can further include suggested meetups or other events local to the end user location. Recommendations can further include suggested medical practitioners local to the end user location, for example as part of a health application. Recommendations can further include suggested rideshare services or operators local to the end user location. As yet another example, a location-based service can provide advertisements based on the end user location, such as advertisements for local businesses. As yet another example, a location-based service operated by a business or other organization can provide content to employees based on their locations. Such content can include but is not limited to a communication platform (e.g., a discussion forum with posts and/or users filtered based on location), files and other data deemed accessible from the location at which access is requested, legal information specific to location, and organization news specific to location. Still further, providing location-based services in connection with the systems/methods herein can include generating or affecting user experiences relating to social networking, location-specific advertising, navigation, web searching, financial services, weather, person/object tracking, etc. The present systems/methods can be broadly applied in any setting in which services are provided to users in a manner that is dependent upon location of the user.

Figure 4:
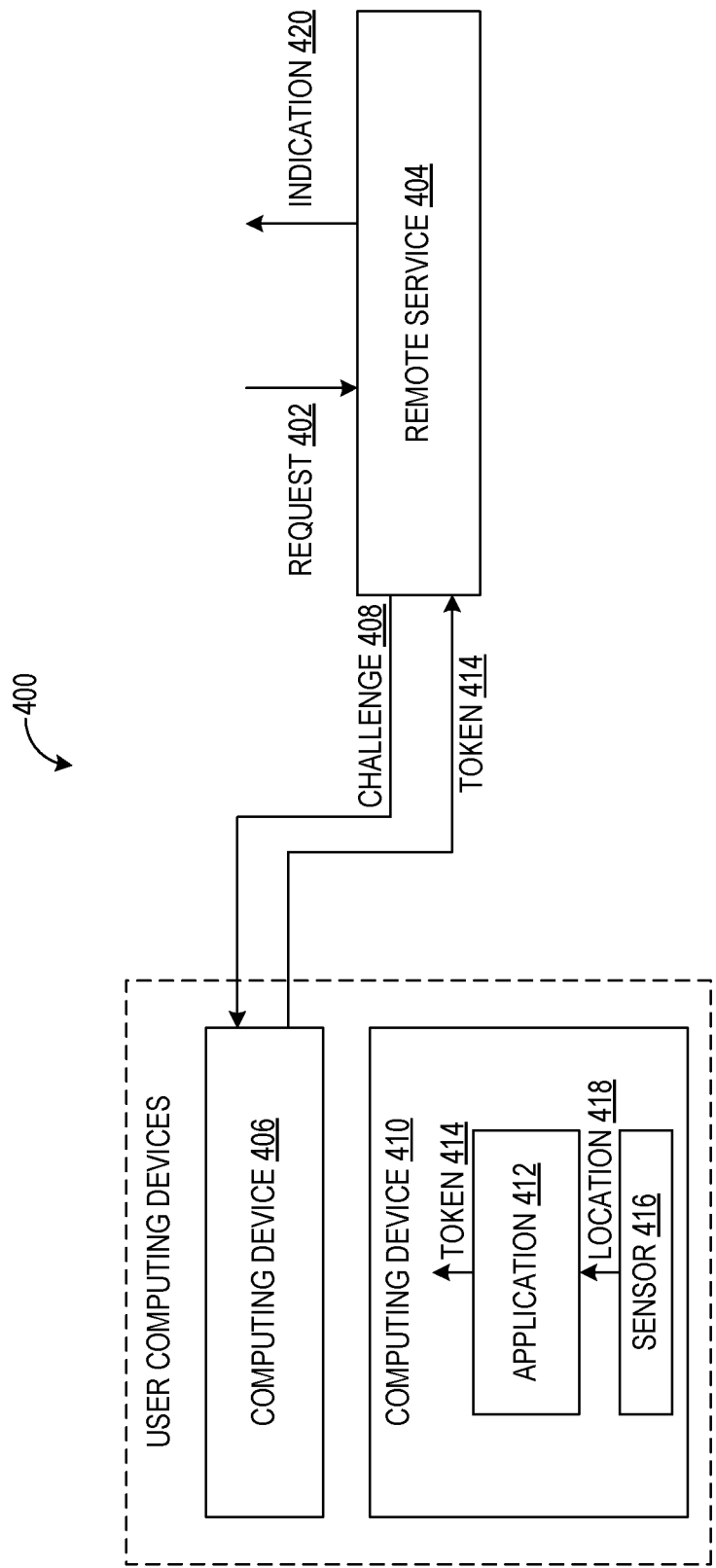
FIG. 4 shows an illustration depicting an example system in which location-based services are provided based on a location-based authorization process.

FIG. 4 schematically shows an example system 400 in which one or more location-based services are provided according to a location-based authorization process. System 400 can implement aspects of system 200, which are not repeated here. In system 400, a request 402 for a location-based service is received at a remote service 404. In some examples, request 402 is issued from a first computing device 406 associated with a user attempting to access the service. In other examples, request 402 is issued from another device or location (e.g., on behalf of the requesting user), such as server(s) that provide the service. Thus, in some examples, request 402 can include an explicit request issued by the requesting user (e.g., a request to access files or other data, a request to use an application, a request for a recommendation). In other examples, request 402 can take the form of a trigger that prompts provision of a location-based service contingent upon the location of the requesting user, rather than an explicit request issued by the requesting user. Here, the trigger can be issued in response to the user logging in to a user account, domain, network location, or portal, as examples. Alternatively or additionally, the trigger can be issued in response to the user executing an application.

A location-based access policy stipulates condition(s) regarding the location from which the location-based service can be provided to remote devices such as first computing device 406. In service of this policy, remote service 404 sends, to the first computing device 406, a challenge 408 for location information that can be used to determine whether the user's location satisfies the location-based access policy. Challenge 408 solicits the user for the location information in an encoded form referred to as a location token.

A second computing device 410 associated with the requesting user executes an application 412 for verifying the user's location. Application 412 generates a location token 414, which can be validated by remote service 404 to thereby determine the location of first computing device 410 and control provision of the requested location-based service from the computing device 406. The location of computing device 410 can be determined in any suitable manner. In the depicted example, the location is detected via a sensor 416 (e.g., GPS sensor) of computing device 410. This location is output in the form of location information 418, which can assume any suitable form, including but not limited to GPS coordinates and/or code representing the country in which computing device 410 resides. Location information 418 is received at application 412, which generates location token 414 based on the location information 418, and potentially based on additional information (e.g., a timestamp, other location information). In some examples, application 412 can hash and/or encrypt the data used to generate location token 414, as described above. As such, location token 414 can be hashed and/or encrypted.

Once generated, location token 414 is entered at computing device 406 via a suitable input device (e.g., keyboard, image sensor) and is then provided to remote service 404 to respond to challenge 408. Remote service 404 then attempts to validate token 414, which can include decrypting the token 414 and/or comparing a hash code included in the token 414 to a hash code generated at the remote service 404. If token 414 is validated, remote service 404 outputs an indication 420 indicating that provision of the requested location-based service to the location of the requesting user is allowed. Indication 420 can be output to a server hosting/providing the service, for example, or to any other suitable location. Subsequently, the service can be provided to computing device 406. If instead token 414 is not validated, remote service 404 outputs indication 420 indicating that provision of the service is denied. In this case, provision of the service can be reattempted, for example using a different location token generated after token 414.

Figure 5:
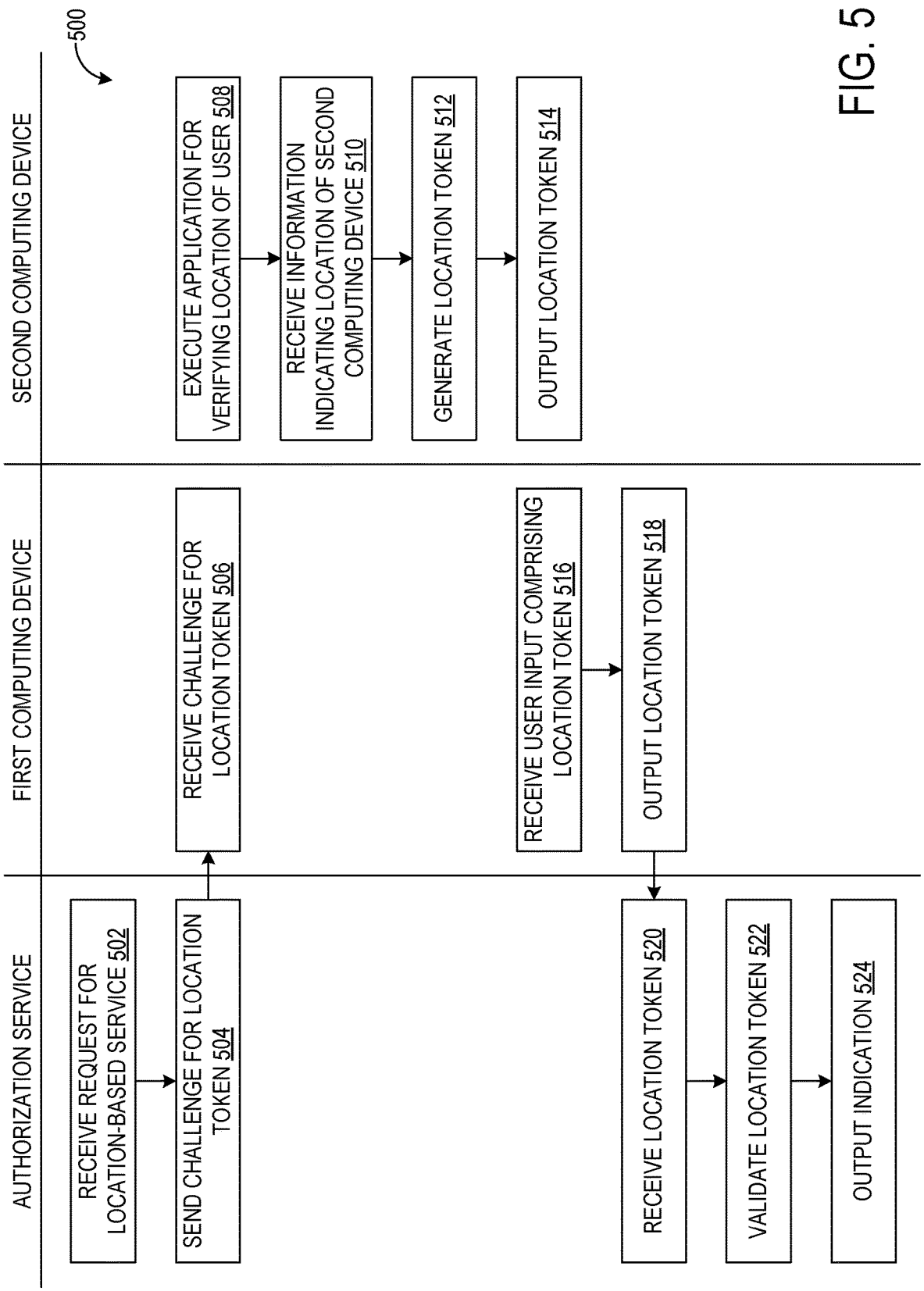
FIG. 5 shows an illustration of operations of another method performed according to an example embodiment of the present disclosure.

FIG. 5 shows a flowchart illustrating a method 500 of authorizing provision of location-based services. Method 500 can be implemented at system 400 of FIG. 4, for example.

At 502, method 500 includes, at an authorization service (e.g., authorization service 212 and/or remote service 404), receiving a request for a location-based service. At 504, method 500 includes sending, from the authorization service to a first computing device associated with a user, a challenge for a location token.

At 506, method 500 includes, at the first computing device, receiving the challenge for the location token. At 508, method 500 includes, at a second computing device associated with the user, executing an application for verifying a location of the user. At 510, method 500 includes, receiving information indicating the location of the second computing device. In some examples, the location information can be received from a sensor of the second computing device. At 512, method 500 includes, at the second computing device, generating a location token for responding to the challenge. Generating the location token can include encoding (e.g., hashing and/or encrypting) the location information and potentially additional information (e.g., a timestamp, an indication of a country manually entered by the user at the first computing device, a location of a device communicatively coupled to the second computing device). At 514, method 500 includes, outputting, at the second computing device, the location token. For example, the location token can be output via a display of the second computing device.

At 516, method 500 includes, at the first computing device, receiving user input comprising the location token. For example, the location token can be received via an input device communicatively coupled to the first computing device, such as a keyboard or an image sensor. At 518, method 500 includes outputting, from the first computing device to the authorization service, the location token.

At 520, method 500 includes, at the authorization service, receiving the location token. At 522, method 500 includes validating, at the authorization service, the location token. Validating the location token can include decrypting the location token, evaluating a hash code included in the location token, and/or evaluating other information (e.g., timestamp, country code) included in the location token. At 524, method 500 includes outputting, from the authorization service, an indication as to whether the location token is validated. The indication can be output to a server hosting/providing the requested location-based server, or to any other suitable location. If, for example, the location token is deemed valid, the server can provide the service, which can be received at the first computing device. If, for example, the location token is deemed invalid, the server can deny provision of the service to the first computing device.

The location-based authorization process disclosed herein can provide a robust and accurate mechanism for determining user location while mitigating potential pathways for spoofing location information. As such, the potential for obtaining unauthorized access to protected resources/location-based services can be reduced, supporting enforcement of location-based access policies, secure hosting of protected resources/services, user authentication, data confidentiality, data integrity, and non-repudiation. These and other potential benefits can be achieved without invasive user tracking or privacy violation.

More specifically, security can be enhanced by separating protected resource/service access and location determination between different computing devices (e.g., computing devices 202 and 218, respectively). Consequently, theft of merely one of a user's credentials or their computing device used to execute application 220 would be insufficient to obtain unauthorized access to a protected resource/service. Security can be further enhanced where different networks are used to receive protected resources/services and to generate location tokens. Further, the generation of location tokens at a user computing device (e.g., computing device 218), rather than at an authorization service or resource server, imposes a greater responsibility on a requesting user to provide valid location information, thereby rendering location spoofing and unauthorized access more difficult. Still further, the potential for spoofing location information can be reduced by sensing (e.g., via a GPS sensor) or otherwise programmatically determining location information, rather than relying on manual user entry of location alone. This can also help avert penalties that might otherwise be levied against a user were the user to inadvertently receive a protected resource/service at a location different than another location manually identified by the user. The user identification of location can provide additional information to validate their actual location and to identify attempts to obtain unauthorized access to protected resources/services, however. Still further, the security of protected resource/service hosting/storage can be enhanced by the user of per-user encryption and/or hashing. For example, a computing device not registered to a user requesting a protected resource/service would not be leverageable to obtain a valid location token for achieving access to the protected resource/service; if the computing device were instead registered to a different user, the location token would be encrypted and/or hashed with a secret key specific to that different user, and would fail to be decrypted at authorization service 212 in service of a request from the registered user.

Figure 6:
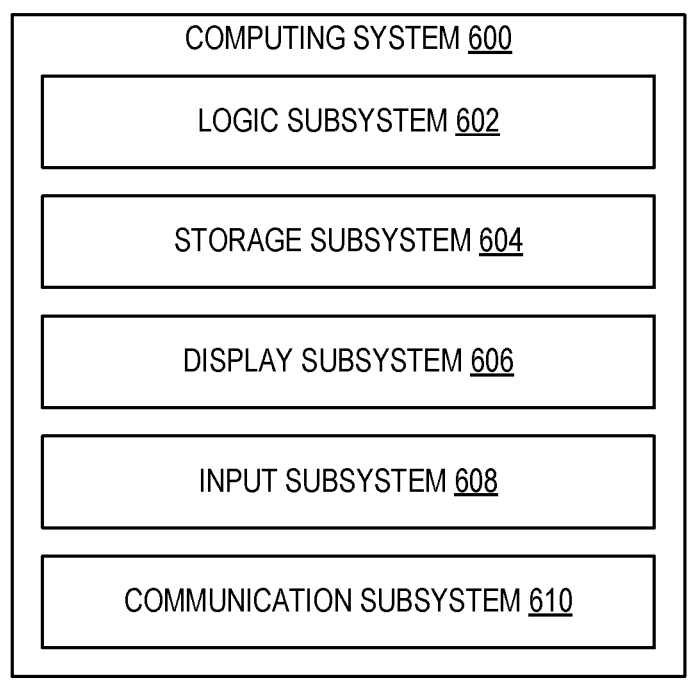
FIG. 6 shows an illustration of an example computing system.

FIG. 6 schematically shows a non-limiting embodiment of a computing system 600 that can enact one or more of the methods and processes described above. Computing system 600 is shown in simplified form. Computing system 600 can take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 can optionally include a display subsystem 606, input subsystem 608, communication subsystem 610, and/or other components not shown in FIG. 6.

Logic subsystem 602 includes one or more physical devices configured to execute instructions. For example, the logic subsystem can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic subsystem can include one or more processors configured to execute software instructions. Additionally or alternatively, the logic subsystem can include one or more hardware or firmware logic subsystems configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 604 includes one or more physical devices configured to hold instructions executable by the logic subsystem to implement the methods and processes described herein. When such methods and processes are implemented, the state of storage subsystem 604 can be transformed—e.g., to hold different data.

Storage subsystem 604 can include removable and/or built-in devices. Storage subsystem 604 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 can include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively can be propagated by a communication medium (e.g., an electromagnetic signal, an optical signal, etc.) that is not held by a physical device for a finite duration.

Aspects of logic subsystem 602 and storage subsystem 604 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "application", and "engine" can be used to describe an aspect of computing system 600 implemented to perform a particular function. In some cases, a module, program, application, or engine may be instantiated via logic subsystem 602 executing instructions held by storage subsystem 604. It will be understood that different modules, programs, application, and/or engines may be instantiated from the same application, service, code block, object, library, routine, API, function, etc. Likewise, the same module, program, application, and/or engine may be instantiated by different applications, services, code blocks, objects, routines, APIs, functions, etc. The terms "module," "program," "application", and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides, at a computing device, a method, comprising executing an application for verifying a location of a user requesting to access a location-based service, receiving, at the application, information indicating a location of the computing device, encoding, with the application, at least the location to thereby generate a location token for responding to a challenge for the location token, and outputting the location token from the application, the location token configured for use in applying a location-based access policy that controls access by the user to the location-based service. In such an example, encoding at least the location can comprise hashing at least the location via a user-specific secret key to thereby generate the location token. In such an example, the user-specific secret key alternatively or additionally can be configured for use in validating the location token. In such an example, receiving the information indicating the location of the computing device can comprise detecting the location via a sensor of the computing device. In such an example, the information indicating the location of the computing device can indicate a country in which the computing device resides. In such an example, the method alternatively or additionally can comprise hashing a timestamp along with the location to thereby generate the location token. In such an example, the location token alternatively or additionally can be invalidated upon expiration of a threshold duration. In such an example, the challenge for the location token can be received at another computing device at which access by the user to the location-based service is requested. In such an example, the computing device can be registered to the user. In such an example, outputting the location token can comprise displaying the location token on a display of the computing device.

Another example provides a computing device, comprising a logic subsystem, and a storage subsystem comprising instructions executable by the logic subsystem to output a request by a user to access a location-based service, receive a challenge for a location token, receive user input comprising the location token, the location token being generated at another computing device of the user, and output the location token, the location token configured for use in applying a location-based access policy that controls access by the user to the location-based service. In such an example, the instructions can be further executable to, where the location-based access policy grants access by the user to the location-based service, access the location-based service. In such an example, the location token alternatively or additionally can comprise information indicating a location of the other computing device. In such an example, the location token alternatively or additionally can be generated via a user-specific secret key. In such an example, the user-specific secret key can be configured for use in decoding the location token. In such an example, the location token alternatively or additionally can be invalidated upon expiration of a threshold duration.

Another example provides a method of authorizing user access to location-based services, the method comprising, at a first computing device, outputting a request by a user to access a location-based service, and receiving a challenge for a location token, at a second computing device, executing an application for verifying a location of the user requesting access to the location-based service, receiving, at the application, information indicating a location of the second computing device, encoding, with the application and via a user-specific secret key, at least the location of the second computing device to thereby generate the location token, and outputting the location token from the application, at the first computing device, receiving user input comprising the location token, and outputting the location token, the location token configured for validation using the user-specific secret key to thereby verify the location of the second computing device, where the location of the second computing device at least in part controls access by the user to the location-based service. In such an example, receiving the information indicating the location of the second computing device can comprise detecting the location via a sensor of the second computing device. In such an example, the method alternatively or additionally can comprise hashing, with the application at the second computing device, a timestamp along with the location to thereby generate the location token. In such an example, the location token alternatively or additionally can be invalidated upon expiration of a threshold duration.

Further, the disclosure comprises embodiments according to the following clauses:

Clause 1. At a computing device, a method, comprising:
executing an application for verifying a location of a user requesting to access a location-based service;
receiving, at the application, information indicating a location of the computing device;
encoding, with the application, at least the location to thereby generate a location token for responding to a challenge for the location token; and
outputting the location token from the application, the location token configured for use in applying a location-based access policy that controls access by the user to the location-based service.

Clause 2. The method of clause 1, where encoding at least the location comprises hashing at least the location via a user-specific secret key to thereby generate the location token.

Clause 3. The method of any of clauses 1 and 2, where the user-specific secret key is configured for use in validating the location token.

Clause 4. The method of any of clauses 1-3, where receiving the information indicating the location of the computing device comprises detecting the location via a sensor of the computing device.

Clause 5. The method of any of clauses 1-4, where the information indicating the location of the computing device indicates a country in which the computing device resides.

Clause 6. The method of any of clauses 1-5, further comprising hashing a timestamp along with the location to thereby generate the location token.

Clause 7. The method of any of clauses 1-6, where the location token is invalidated upon expiration of a threshold duration.

Clause 8. The method of any of clauses 1-7, where the challenge for the location token is received at another computing device at which access by the user to the location-based service is requested.

Clause 9. The method of any of clauses 1-8, where the computing device is registered to the user.

Clause 10. The method of any of clauses 1-9, where outputting the location token comprises displaying the location token on a display of the computing device.

Clause 11. A computing device, comprising:
a logic subsystem; and
a storage subsystem comprising instructions executable by the logic subsystem to:
output a request by a user to access a location-based service;
receive a challenge for a location token;
receive user input comprising the location token, the location token being generated at another computing device associated with the user; and
output the location token, the location token configured for use in applying a location-based access policy that controls access by the user to the location-based service.

Clause 12. The method of clause 11, further comprising instructions executable to, where the location-based access policy grants access by the user to the location-based service, access the location-based service.

Clause 13. The method of any of clauses 11 and 12, where the location token comprises information indicating a location of the other computing device.

Clause 14. The method of any of clauses 11-13, where the location token is generated via a user-specific secret key.

Clause 15. The method of any of clauses 11-14, where the user-specific secret key is configured for use in decoding the location token.

Clause 16. The method of any of clauses 11-15, where the location token is invalidated upon expiration of a threshold duration.

Clause 17. A method of authorizing user access to location-based services, the method comprising:
at a first computing device,
outputting a request by a user to access a location-based service; and
receiving a challenge for a location token;
at a second computing device,
executing an application for verifying a location of the user requesting access to the location-based service;
receiving, at the application, information indicating a location of the second computing device;
encoding, with the application and via a user-specific secret key, at least the location of the second computing device to thereby generate the location token; and
outputting the location token from the application;
at the first computing device,
receiving user input comprising the location token; and
outputting the location token, the location token configured for validation using the user-specific secret key to thereby verify the location of the second computing device, where the location of the second computing device at least in part controls access by the user to the location-based service.

Clause 18. The method of clause 17, where receiving the information indicating the location of the second computing device comprises detecting the location via a sensor of the second computing device.

Clause 19. The method of any of clauses 17 and 18, further comprising hashing, with the application at the second computing device, a timestamp along with the location to thereby generate the location token.

Clause 20. The method of any of clauses 17-19, where the location token is invalidated upon expiration of a threshold duration.

To the extent that terms "includes," "including," "has," "contains," and variants thereof are used herein, such terms are intended to be inclusive in a manner similar to the term "comprises" as an open transition word without precluding any additional or other elements.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. At a computing device, a method, comprising:
executing an application for verifying a location of a user requesting to access a location-based service;
receiving, at the application, information indicating a location of the computing device;
encoding, with the application, at least the location of the computing device to thereby generate a location token for responding to a challenge for the location token, wherein encoding at least the location of the computing device comprises hashing at least the location of the computing device via a user-specific secret key to thereby generate the location token, and where the user-specific secret key is configured for use in validating the location token; and
outputting the location token from the application, the location token configured to be decoded using the user-specific secret key to thereby reveal a hash of at least the location of the computing device, the hash of at least the location of the computing device configured to be compared to a validation hash generated for a whitelisted location to thereby verify the location of the computing device for use in applying a location-based access policy that controls access by the user to the location-based service based at least on the location of the computing device.

2. The method of claim 1, where receiving the information indicating the location of the computing device comprises detecting the location via a sensor of the computing device.

3. The method of claim 1, where the information indicating the location of the computing device indicates a country in which the computing device resides.

4. The method of claim 1, further comprising hashing a timestamp along with the location of the computing device to thereby generate the location token.

5. The method of claim 1, where the location token is invalidated upon expiration of a threshold duration.

6. The method of claim 1, where the challenge for the location token is received at another computing device at which access by the user to the location-based service is requested.

7. The method of claim 1, where the computing device is registered to the user.

8. The method of claim 1, where outputting the location token comprises displaying the location token on a display of the computing device.

9. A computing device, comprising:
a logic subsystem; and
a storage subsystem comprising instructions executable by the logic subsystem to:
output a request by a user to access a location-based service;
receive a challenge for a location token;
receive user input comprising the location token, the location token being generated at another computing device associated with the user, wherein the location token encodes at least a location of the another computing device associated with the user as a hash of at least the location of the another computing device generated with a user-specific secret key; and
output the location token, the location token configured to be decoded using the user-specific secret key to thereby reveal the hash of at least the location of the another computing device, the hash of at least the location of the another computing device configured to be compared to a validation hash generated for a whitelisted location to thereby verify the location of the another computing device for use in applying a location-based access policy that controls access by the user to the location-based service based at least on the location of the another computing device.

10. The computing device of claim 9, further comprising instructions executable to, where the location-based access policy grants access by the user to the location-based service, access the location-based service.

11. The computing device of claim 9, where the location token is invalidated upon expiration of a threshold duration.

12. The computing device of claim 9, wherein the location token further encodes a timestamp.

13. The computing device of claim 9, wherein the location of the another computing device indicates a country in which the another computing device resides.

14. The computing device of claim 9, wherein the instructions executable to output the location token include instructions executable to display the location token on a display of the computing device.

15. A method of authorizing user access to location-based services, the method comprising:
at a first computing device,
outputting a request by a user to access a location-based service; and
receiving a challenge for a location token;
at a second computing device,
executing an application for verifying a location of the user requesting access to the location-based service;
receiving, at the application, information indicating a location of the second computing device;
encoding, with the application and via a user-specific secret key, at least the location of the second computing device to thereby generate the location token, wherein encoding at least the location of the second computing device comprises hashing, with the application at the second computing device, at least the location of the second computing device via the user-specific secret key to thereby generate a hash of at least the location of the second computing device; and
outputting the location token from the application;
at the first computing device,
receiving user input comprising the location token; and
outputting the location token, the location token configured to be decoded using the user-specific secret key to thereby reveal the hash of at least the location of the second computing device, the hash of at least the location of the second computing device configured to be compared to a validation hash generated for a whitelisted location for validation to thereby verify the location of the second computing device, where the location of the second computing device at least in part controls access by the user to the location-based service.

16. The method of claim 15, where receiving the information indicating the location of the second computing device comprises detecting the location of the second computing device via a sensor of the second computing device.

17. The method of claim 15, further comprising hashing, with the application at the second computing device, a timestamp along with the location of the second computing device to thereby generate the location token.

18. The method of claim 15, where the location token is invalidated upon expiration of a threshold duration.

19. The method of claim 15, wherein the location of the second computing device indicates a country in which the second computing device resides.

20. The method of claim 15, where outputting the location token comprises displaying the location token on a display of the first computing device.

* * * * *